(12) United States Patent
Nilsson et al.

(10) Patent No.: US 6,209,919 B1
(45) Date of Patent: Apr. 3, 2001

(54) FOLDER

(75) Inventors: Eric Nilsson, Stockholm; Magnus Ottenstedt, Saltsjö-Boo, both of (SE)

(73) Assignee: Mediacard AB, Stockholm (SE)

( * ) Notice: Subject to any disclaimer, the term of this patent is extended or adjusted under 35 U.S.C. 154(b) by 0 days.

(21) Appl. No.: 09/423,289

(22) PCT Filed: May 29, 1998

(86) PCT No.: PCT/SE98/01024

§ 371 Date: Nov. 8, 1999

§ 102(e) Date: Nov. 8, 1999

(87) PCT Pub. No.: WO98/54686

PCT Pub. Date: Dec. 3, 1998

(30) Foreign Application Priority Data

May 30, 1997 (SE) .................................................... 9702051

(51) Int. Cl.⁷ .................................................... B42D 15/00
(52) U.S. Cl. .................. 283/61; 281/2; 281/15.1; 283/34; 283/62; 462/8; 462/64
(58) Field of Search .................. 281/2, 5, 9, 12, 281/15.1; 462/8, 17, 64, 65; 283/34, 35, 61, 62

(56) References Cited

U.S. PATENT DOCUMENTS

| 354,138 | * | 12/1886 | Homan | 462/8 |
| 1,161,580 | * | 11/1915 | Allen | 283/63.1 |
| 1,506,956 | | 9/1924 | Thompson . | |
| 2,572,460 | * | 10/1951 | Falk | 281/1 |
| 4,289,333 | * | 9/1981 | Gaetano | 283/35 |
| 4,606,553 | | 8/1986 | Nickerson | 281/5 |
| 4,637,633 | | 1/1987 | Instance | 283/81 |
| 5,997,043 | * | 12/1999 | Dahlquist | 283/63.1 |

FOREIGN PATENT DOCUMENTS

| 0 256 672 | 2/1988 | (EP) . |
| 0 288 472 | 11/1988 | (EP) . |
| 2 722 665 | 1/1996 | (FR) . |

* cited by examiner

*Primary Examiner*—A. L. Wellington
*Assistant Examiner*—Monica S. Carter
(74) *Attorney, Agent, or Firm*—Jacobson, Price, Holman & Stern, PLLC

(57) ABSTRACT

A folder comprising a sheet (1) which is pleated in a concertina-like fashion (10, 11, 12) and which, in a pleated state, is folded around fold lines (14, 15) that extend perpendicularly to the pleat line (10, 11, 12) in the pleated sheet, wherein the sheet (1) is surrounded by a protective cover (2) when in a fully folded-up state. The two sheet fold-lines (14, 15) extending perpendicular to the pleat lines (10, 11, 12) face in mutually the same direction, so as to enable the two end-panels of the pleated sheet (1) to be folded in overlapping relationship with the center panel. The cover (2) is a paperboard cover against which one pleated panel (40) of the sheet is fastened in a centered position on one side of the cover (2), wherein the cover also includes fold lines (24, 25) which coincide generally with the fold lines (14, 15) on the sheet (1). The cover is provided on the inner (23) of the two mutually overlapping outer panels (21, 23) a tongue (26) which receives therebeneath the free end of the outer (21) of the two mutually overlapping outer panels (21, 23), which panels also overlap the center panel (22) when the folder is in a fully folded-up state.

8 Claims, 2 Drawing Sheets

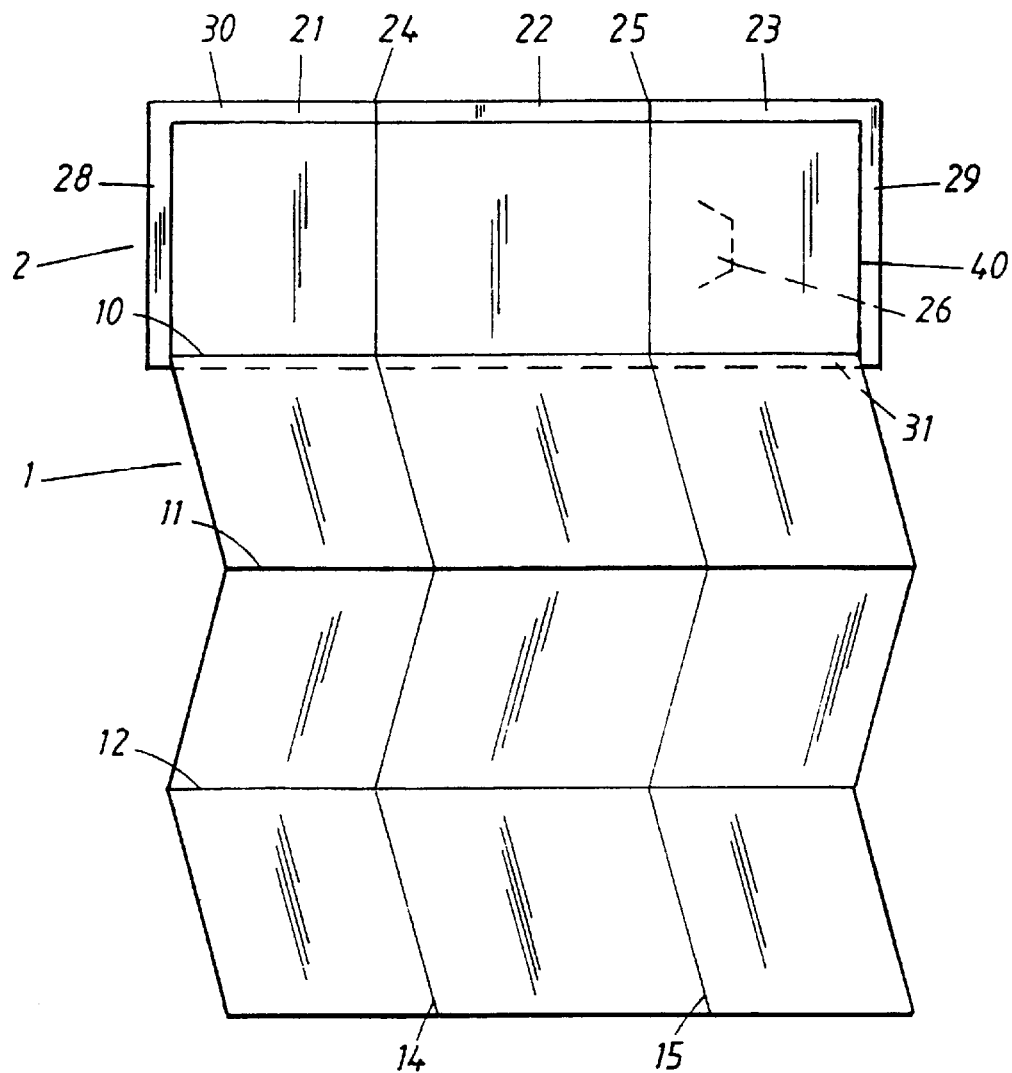

FOLDER

BACKGROUND OF THE INVENTION

1. Field of the Invention

The present invention relates to a folder that includes a pleated sheet which, in a pleated state, is folded to a form that comprises three mutually overlapping panels, and also a sheet cover.

Maps, information sheets and the like are often of significant information value but must be capable of being folded-up to a small size between times of use, for instance into a thin, flat and rectangular product, and preferably a product that corresponds in size to a cash card (CR80), so as to enable the product to be kept in a cash-card pocket of a wallet.

However, it is necessary to be able to produce the folder cheaply, meaning that the sheet must also be capable of being produced at lost cost and to allow the cover and sheet to be easily joined together with the least possible folding of the sheet and product.

EP-B1-0 288 472 teaches a product of this kind where the map/sheet is folded together with concertina-like pleats in one direction and which when extended in a concertina-like fashion has two mutually parallel and mutually separated fold lines that are perpendicular to the pleat-lines on the extended sheet and divide the sheet into three panels which have mutually the same width and which can be Z-folded. Both of the exposed main surfaces of the sheet are then covered by a respective rigid cover sheet, these cover sheets together enclosing the map/sheet. One of the problems remaining, however, is that two separate covers are required and that these covers must be accurately fastened to the associated sheet-panels. Furthermore, expensive fastener means in the form of magnets or touch-and-close fasteners are required around the perimeter of respective covers, in order to hold the covers together and therewith enclose the folded sheet therebetween. It is also required that the fastener devices are in accurate alignment with one another.

FR-A-2 722 665 teaches a product similar to that taught in EP-B1-0 288 472, although in this case the two cover sheets are hinged together, and the information sheet is connected solely to one of said covers. The problems, however, are essentially the same.

2. Summary of the Invention

Accordingly, an object of the present invention is to provide a folder that can be produced with practical pleating or folding of the sheet and with a simple single-piece cover, and with fastener means for holding the product together that can be produced readily and in a simple manner.

This object is achieved with a folder of the design defined by a folder having a sheet (1) that is pleated in a concertina fashion (10, 11, 12) and that when in a pleated state is folded around fold lines (14, 15) that extend perpendicular to the pleat lines (10, 11, 12). Wherein, when in a fully folded state, the sheet (1) is surrounded by a protective cover (2) in the form of a paperboard cover, and the two sheet fold-lines (14, 15) that extend perpendicular to the pleat lines (10, 11, 12) face in the same direction so as to enable the two end-panels of the pleated sheet (1) to be folded over the center panel. A concertina pleat panel (40) of the sheet (1) is fastened in a center position on the inside of the cover (2). The concertina pleat panel (40) has a length slightly shorter than the length of the cover and is fastened to the cover along the whole of its length. The paperboard cover has fold lines (24, 25) in alignment with the fold lines (14, 15) of the sheet (1), and the paperboard cover has a tongue provided on the inner panel (23) of the two mutually overlapping outer panels (21, 23) at a distance from the end of the paperboard cover. The tongue receives therebeneath the free end of the outer panel (21) of the two mutually overlapping outer paperboard panels (21, 23) which also overlap the center panel (22) when the folder is in a fully folded state.

Further developments of the inventive folder are set forth in the folder because the tongue (26) is formed by a cut (27) through the cover (2), and the tongue (26) is glued to the outside of the cover. The invention is such that when the folder is in a fully folded state, the free end of the inner end-panel (23) is located at the fold line between the two remaining folder panels. With this, the tongue is located in the proximity of one fold line (25) between the paperboard panels (22, 23). It has been suggested that the folder has a generally CR80-format in a folded-up state. Of course, the width of the sheet is slightly smaller than the length of the cover (2) when extended, so that the pleated panels of the concertina-like pleated sheet (1) have a width corresponding to the width of the paperboard cover (2).

One advantage afforded by the invention is that the cover can be produced from a single piece of paperboard which can be fastened to an end-edge of the concertina-like pleats of the sheet in one single fastening operation. The fold lines that extend perpendicular to the concertina-like pleats can be imprinted in the pleated sheet and the cover sheet simultaneously.

Another advantage afforded by the invention is that the cover-holding tongue can be stuck onto the cover, or more preferably cut-out in the cover paperboard. Still another advantage is that when in a folded state, the two main surfaces of the inventive product will be covered by material parts of the single cover sheet, such as bridging with a spine part, so as to enable the product to be inserted into a cash-card pocket of a wallet with the spine part of the product between said main cover-surfaces located foremost, without risk of the product being "split". The risk of the product "splitting" when inserted in the opposite direction is slight, since the center region of the exposed end-edge of the cover is covered by the tongue.

Other significant features of the inventive product and advantages afforded thereby will be apparent from the following description of an exemplifying embodiment thereof. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

FIG. 1 illustrates the folder in a fully extended state.

FIG. 2 is an end view of the folder in a concertina-like folded state but extended around the fold lines.

DESCRIPTION OF THE INVENTION

Figure 3:
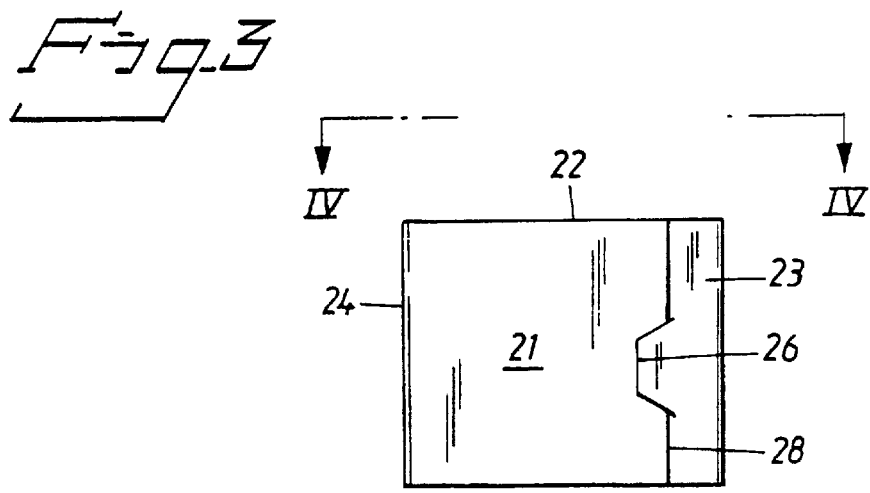
FIG. 3 is a front view of the folder when in a fully folded state.

FIG. 1 shows a sheet 1 in a generally extended state. The sheet 1 carries information, for example has the form of a map either with or without advertisements. The sheet includes a plurality of mutually parallel and equidistantly spaced pleat lines 10, 11, 12 which define a concertina-like pleating of a number of sheet panels of mutually equal width, of which one panel 40 is secured, e.g. glued, to a paperboard cover 2 whose dimensions are slightly greater than the dimensions of the panel 40. The pleated sheet also includes two mutually parallel fold lines 14, 15 which coincide essentially with corresponding fold lines 24, 25 in the paperboard cover 2 and which may be formed simultaneously in the sheet and cover 2. The fold lines 24, 25 divide the sheet 2 into three panels 21, 22, 23, of which the center panel is longer than the other two panels 21, 23. FIG. 1 also shows that the perimeter edge 28, 29, 30, 31 of the cover 2 projects slightly beyond the contours of the end panels, or side panels, 40 of the sheet 1, although the edge parts 30, 31 can be minimized.

Figure 4:
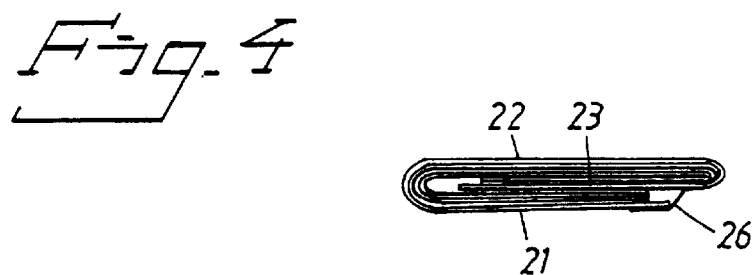
FIG. 4 is a view taken on the line IV—IV in FIG. 3.
Figure 5:
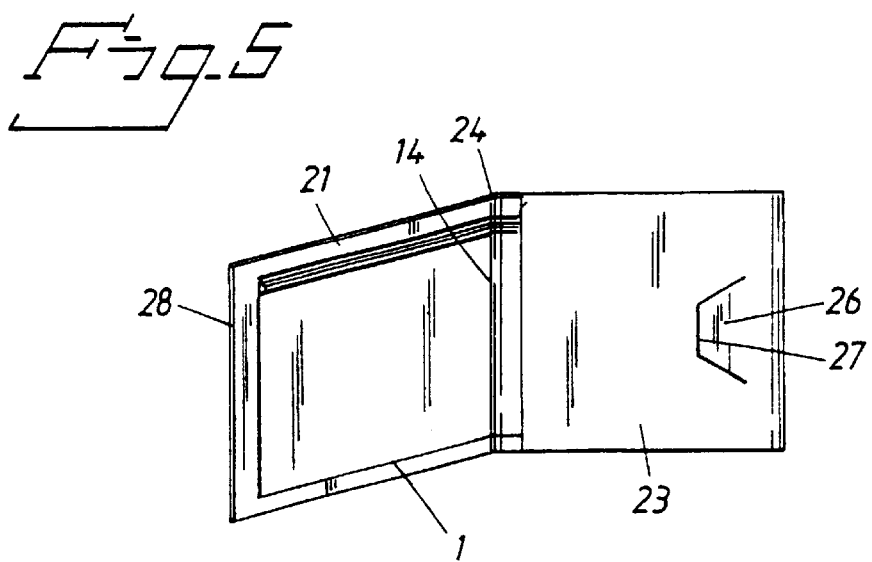
FIG. 5 is a view corresponding to the view of FIG. 3 but showing a cover panel with an associated part of the concertina-like sheet in an extended state.

As will be seen from FIGS. 3 and 4, the end-panels 21, 23 of the cover 2 overlap each other over the center panel 22, so that the paperboard panel 21 will lie outermost on the front side of the product.

It will also be seen that a slot 27 is cut in the paperboard panel 23 so as to form a tongue 26 which extends away from the fold line 25 of the paperboard and which is located in the proximity of said fold line. The edge 28 of the paperboard can be inserted in beneath the tongue 26, so as to hold the product together in a flat, folded-up state.

As will be understood, the tongue 26 may alternatively be a separate paperboard tongue glued to the panel 23 of the paperboard cover 2.

When folded together (FIG. 3), the product will conveniently have a CR80-format, so as to enable the product to be kept in a cash-card pocket of a wallet, said product conveniently being inserted with the fold-line region 24 foremost in the insertion direction. The invention being thus described, it will be obvious that the same may be varied in many ways. Such variations are not to be regarded as a departure from the spirit and scope of the invention, and all such modifications as would be recognized by one skilled in the art are intended to be included within the scope of the following claims. Because the tongue covers a central part of the free end-edge of the panel 21, there is very little risk of the product "splitting" even when inserted in the opposite direction.

What is claimed is:

1. A folder comprising:

a sheet having a plurality of pleated lines for folding in a concertina fashion to form a pleated sheet with a center panel and when, in a pleated state, said pleated sheet is folded around fold lines that extend perpendicular to the pleat lines;

a protective cover forming a paperboard cover for surrounding said pleated sheet when in a fully folded state and said fold lines extending perpendicular to the pleat lines in a same direction so as to enable two end-panels of the pleated sheet to be folded over said center panel of said pleated sheet;

a concertina pleat panel of said pleated sheet fastened in a center position on an inside of the cover, the concertina pleat panel having a length slightly shorter than a length of the protective cover and fastened to the protective cover along the length, the paperboard cover having fold lines in alignment with the fold lines of the pleated sheet;

a tongue provided on an inner panel of two mutually overlapping outer panels of the paperboard cover at a distance from an end of the paperboard cover, wherein said tongue receives therebeneath a free end of an outer panel of said two mutually overlapping outer paperboard panels which also overlap the center panel when the folder is in a fully folded state; and wherein the tongue is located in the proximity of one fold line between the paperboard panels.

2. A folder according to claim 1, wherein in that the tongue is formed by a cut through the cover.

3. A folder according to claim 1, wherein in that the tongue is glued to the paperboard cover.

4. A folder according to claim 1, wherein when the folder is in a fully folded state, the free end of the inner end-panel is located at the fold line between the two remaining folder panels.

5. A folder according to claims 1, wherein the folder has a generally CR80-format in a folded-up state.

6. A folder according to claim 1, wherein a width of the sheet is slightly smaller than the length of the cover when extended.

7. A folder according to claim 1, wherein the pleated panels of the concertina-like pleated sheet have a width corresponding to the width of the paperboard cover.

8. A folder according to claim 1, wherein the panel of the consertina folded sheet being connected to the paperboard cover.

\* \* \* \* \*